United States Patent
Coakley et al.

(10) Patent No.: US 10,640,018 B2
(45) Date of Patent: May 5, 2020

(54) CHILD RESTRAINT SYSTEM FOR JUVENILE VEHICLE SEAT

(71) Applicant: Dorel Juvenile Group, Inc., Foxboro, MA (US)

(72) Inventors: Devin J. Coakley, Bellingham, MA (US); Grant M. Mason, Wrentham, MA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 127 days.

(21) Appl. No.: 15/915,805

(22) Filed: Mar. 8, 2018

(65) Prior Publication Data

US 2018/0257519 A1   Sep. 13, 2018

Related U.S. Application Data

(60) Provisional application No. 62/468,521, filed on Mar. 8, 2017.

(51) Int. Cl.
*B60N 2/28* (2006.01)

(52) U.S. Cl.
CPC ......... *B60N 2/2812* (2013.01); *B60N 2/2851* (2013.01); *B60N 2002/2818* (2013.01)

(58) Field of Classification Search
CPC .. B60N 2/2812; B60N 2/2851; B60N 2/2815; B60N 2/2818; B60N 2002/2818; B60N 22/024
USPC ...................................................... 297/250.1
See application file for complete search history.

(56) References Cited

U.S. PATENT DOCUMENTS

| | | | |
|---|---|---|---|
| 3,901,550 A | 8/1975 | Hamy | |
| 5,061,012 A | 10/1991 | Parker et al. | |
| 5,567,007 A | 10/1996 | Czernakowski et al. | |
| 5,927,804 A | 7/1999 | Cuevas | |
| 6,030,047 A * | 2/2000 | Kain | B60N 2/2812 297/250.1 |
| 6,491,348 B1 * | 12/2002 | Kain | B60N 2/2812 297/250.1 |
| 6,543,897 B1 | 4/2003 | Tung | |
| 6,554,358 B2 | 4/2003 | Kain | |
| 7,445,286 B2 | 11/2008 | Siewertsen et al. | |
| 7,448,683 B2 | 11/2008 | Hendrikus | |
| 7,506,929 B2 | 3/2009 | Fransen et al. | |
| 7,513,575 B1 | 4/2009 | Go | |
| 7,735,919 B2 | 6/2010 | Chen | |
| 8,246,112 B2 | 8/2012 | Yasuda et al. | |
| 8,622,478 B2 * | 1/2014 | Spence | B60N 2/2812 297/484 |
| 8,851,514 B2 | 10/2014 | Renaudin | |
| 9,114,738 B2 | 8/2015 | Franck et al. | |
| 9,428,143 B2 * | 8/2016 | Sparling | B60R 22/12 |
| 10,293,713 B2 * | 5/2019 | Anderson | B60N 2/2812 |
| 2010/0060052 A1 * | 3/2010 | Hutchinson | B60N 2/2812 297/250.1 |
| 2010/0253120 A1 * | 10/2010 | Heisey | B60N 2/2812 297/250.1 |
| 2017/0008429 A1 * | 1/2017 | Johnson | B60N 2/2872 |

* cited by examiner

*Primary Examiner* — Mark R Wendell
(74) *Attorney, Agent, or Firm* — Barnes & Thornburg LLP

(57) ABSTRACT

A child restraint includes a juvenile seat and a child-restraint harness coupled to the juvenile seat. A harness mover is coupled to the seat and harness.

20 Claims, 4 Drawing Sheets

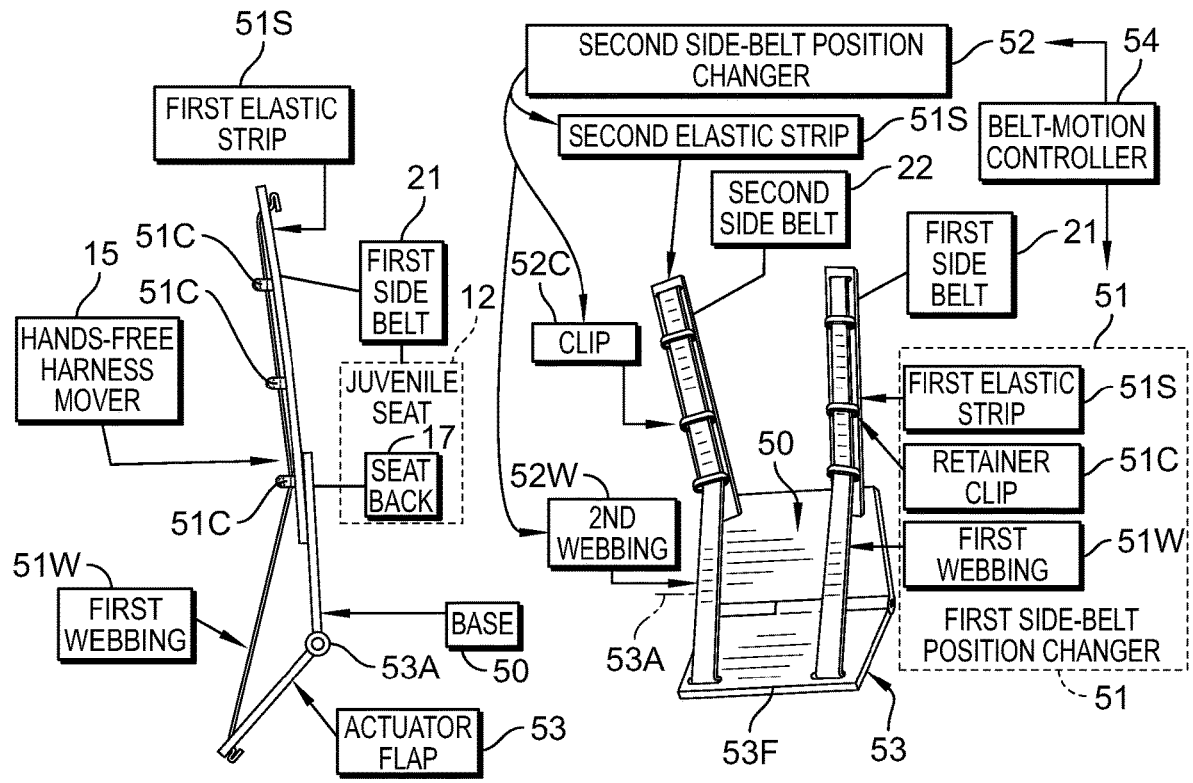
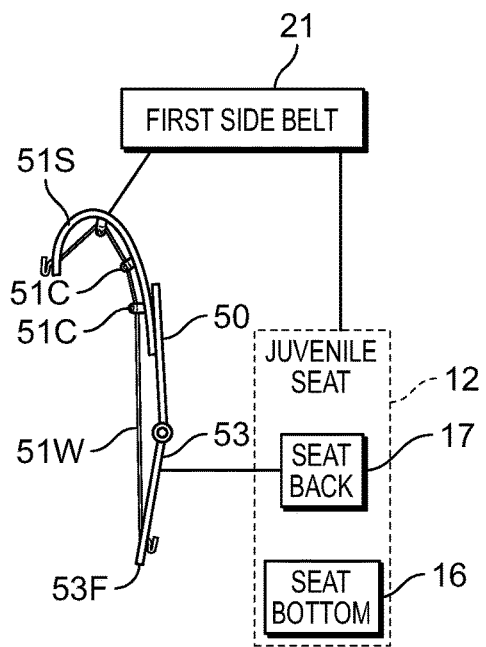
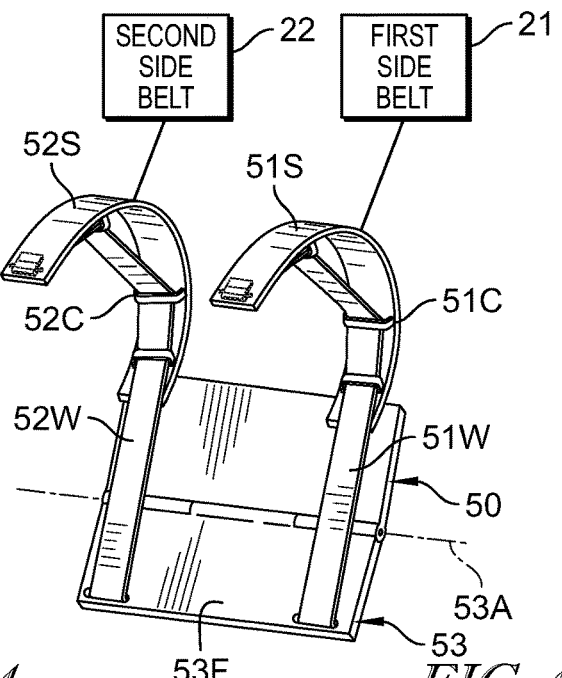
FIG. 3    FIG. 3A    FIG. 4    FIG. 4A

CHILD RESTRAINT SYSTEM FOR JUVENILE VEHICLE SEAT

PRIORITY CLAIM

This application claims priority under 35 U.S.C. § 119(e) to U.S. Provisional Application No. 62/468,521, filed Mar. 8, 2017, which is expressly incorporated by reference herein.

BACKGROUND

The present disclosure relates to child restraints and in particular to juvenile seats for use on passenger seats in vehicles. More particularly, the present disclosure relates to a belt position management system for managing the position of restraint belts associated with a juvenile seat.

SUMMARY

According to the present disclosure, a child restraint includes a juvenile seat having a seat bottom and a seat back extending upwardly from the seat bottom. In illustrative embodiments, the child restraint also includes a child-restraint harness comprising a crotch belt, first and second side belts, and a harness-tightening belt coupled to the first and second side belts at a splitter plate.

In illustrative embodiments, the child restraint also includes a hands-free harness mover that is located behind the back of a child seated on the seat bottom. Using the hands-free harness mover, a caregiver can seat a child in the juvenile seat and remove a child from the juvenile seat without having to handle the side belts in the child-restraint harness manually.

In illustrative embodiments, the seat back includes a backrest arranged to extend upwardly from the seat bottom and a headrest mounted for up-and-down movement on the backrest. The hands-free harness mover is coupled to the headrest for up-and-down movement therewith relative to the seat bottom and is linked to the child-restraint harness.

In illustrative embodiments, the hands-free harness mover is coupled to the first and second side belts of the child-restraint harness and used in accordance with the present disclosure to raise the side belts above the seat bottom automatically to make it easier for a caregiver to seat a child in the juvenile seat and then to lower the side belts toward the seat bottom automatically as the child is being seated by the caregiver to wrap the side belts over the shoulders of the seated child so as to facilitate mating engagement of the side belts with the crotch belt to restrain the seated child.

In illustrative embodiments, the hands-free harness mover is configured to hold shoulder-gripping portions of the first and second side belts automatically in a raised position above the seat bottom so that a caregiver can place a child easily in the juvenile seat under the raised side belts without having to use a hand or some other means to raise the side belts upwardly to allow the child to be placed unhindered in the seat. The hands-free harness mover is also configured to cause automatic hands-free lowering of the shoulder-gripping portions of the first and second side belts toward the seat bottom to a lowered position as the child is placed in the juvenile seat so that the first and second side belts are wrapped over the shoulders of the seated child and arranged to be mated with a free end of the crotch belt to restrain the child in the seat without requiring the caregiver to handle the side belts manually.

In illustrative embodiments the hands-free harness mover includes a base coupled to the headrest, a movable actuator flap, and a belt-motion controller. The movable actuator flap is pivotably coupled to the base and is arranged to be moved by a child (during seating of the child in the juvenile seat) relative to the base from a normal forwardly extended position to a temporary rearwardly retracted position. The belt-motion controller is linked to the movable actuator flap and to shoulder-gripping portions of each of the first and second side belts.

In illustrative embodiments, the belt-motion controller is configured to provide means for moving the shoulder-gripping portions of the first and second side belts automatically from the raised positions in which the side belts are projected upwardly away from the seat bottom to the lowered positions in which the shoulder-gripping portions of the side belts are wrapped over the shoulders of a seated child to lie closer to the seat bottom in response to placement of a child in the juvenile seat in such a way as to contact the movable actuator flap and cause the movable actuator flap to move from the normal forwardly extended position toward the seat back to the temporary rearwardly retracted position. Once the seated child is later removed from the juvenile seat the belt-motion controller provides means for returning the shoulder-gripping portions of the first and second side belts automatically from the lowered positions to the raised positions to separate the side belts from the seated child so that removal of the child from the seat by a caregiver is possible without requiring the caregiver first to grasp both side belts and then move the side belts upwardly from the lowered positions to the raised positions prior to or during removal of the seated child from the juvenile seat.

In illustrative embodiments, the belt-motion controller of the hands-free harness mover includes a first side-belt position changer and a separate second side-belt positioner changer. The first side-belt position changer is coupled at an upper end to the first side belt and at a lower end to the movable actuator flap to cause the movable actuator flap normally (and yieldably) to move to assume the raised position. The second side-belt position changer lies in laterally spaced-apart relation to the first side-belt position changer. The second side-belt position changer includes an upper end coupled to the second side belt and a lower end coupled to the movable actuator flap to assist in causing the movable actuator flap normally (and yieldably) to move to assume the raised position.

In illustrative embodiments, elastic strips included in the position changers function to hold the shoulder-gripping portions of the first and second side belts normally in the raised positions and to hold the movable actuator flap in the normal forwardly extended position. Placing a child in the seat pushes (e.g. pivots) the movable actuator flap to the temporary rearwardly retracted position and such downward pivoting movement of the movable actuator flap applies downward forces to each of the first and second side-belt position changers that is transferred to the first and second side belts to cause those belts to curl and wrap over the shoulders of the child that is now seated in the juvenile seat so that the shoulder-gripping portions of those belts are now held in their lowered positions. When the child is removed from the juvenile seat, the elastic strips recover their original shape to urge the shoulder-gripping portions of the first and second side belts to return to their raised positions and the movable actuator flap is pivoted to its normal forwardly extended position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a diagrammatic side elevation view of the hands-free harness mover illustrated in FIG. 1 showing that the hands-free movable harness mover includes a base adapted to be coupled to the seat back, a movable actuator flap mounted on lower edge of the base for pivotable movement about a horizontal actuator-flap pivot axis, a first elastic strip associated with and linked to the shoulder-gripping portions of the first side belt that is coupled to the juvenile seat, a first webbing having a lower end coupled to a free end of the movable actuator flap and an upper end coupled to an upper tip of the first elastic strip, and several first-webbing retainer clips for coupling the first webbing to the first elastic strip to allow for relative movement between the first webbing and first elastic strip during raising and lowering of the shoulder-gripping portions of the first side belt and showing that the movable actuator flap is pivoted about the horizontal actuator-flap pivot axis relative to the base and the seat back to assume the normal forwardly extended position that is also shown in FIG. 1;

FIG. 3A is a perspective view of the hands-free harness mover of FIG. 3 showing that the hands-free harness mover also includes a second elastic strip associated with and linked to the shoulder-gripping portions of the second side belt that is coupled to the juvenile seat, a second webbing having a lower end coupled to a free end of the movable actuator flap and an upper end coupled to an upper tip of the second elastic strip, and several second-webbing retainer clips for coupling the second webbing to the second elastic strip to allow for relative movement between the second webbing and second elastic strip during raising and lowering of the shoulder-gripping portions of the second side belt;

FIG. 4 is a view similar to FIG. 3 showing the movable actuator flap in the temporary rearwardly retracted position and showing that pivoting movement of the actuator flap from the normal forwardly extended position to the temporary rearwardly retracted position applied a downward force to the lower end of the first webbing which was transferred by the first webbing to the tip of the first elastic strip so as to cause the upper portion of the first elastic strip to curl in a forward and downward direction so that the shoulder-gripping portions of the first side belt that is linked to the first elastic strip moved from the raised position shown in FIG. 1 (and suggested in FIGS. 3 and 3A) to the lowered position shown in FIG. 2 (and suggested in FIGS. 4 and 4A);

FIG. 4A is a perspective view similar to FIG. 3A but showing the child-restraint harness in the CLOSED CHILD-RESTRAINT MODE so that the shoulder-gripping portions of the side belts linked to the elastic strips are moved from the raised positions to the lowered positions to wrap around the shoulders of a child seated in the juvenile seat as suggested in FIG. 2.

DETAILED DESCRIPTION

Figure 1:
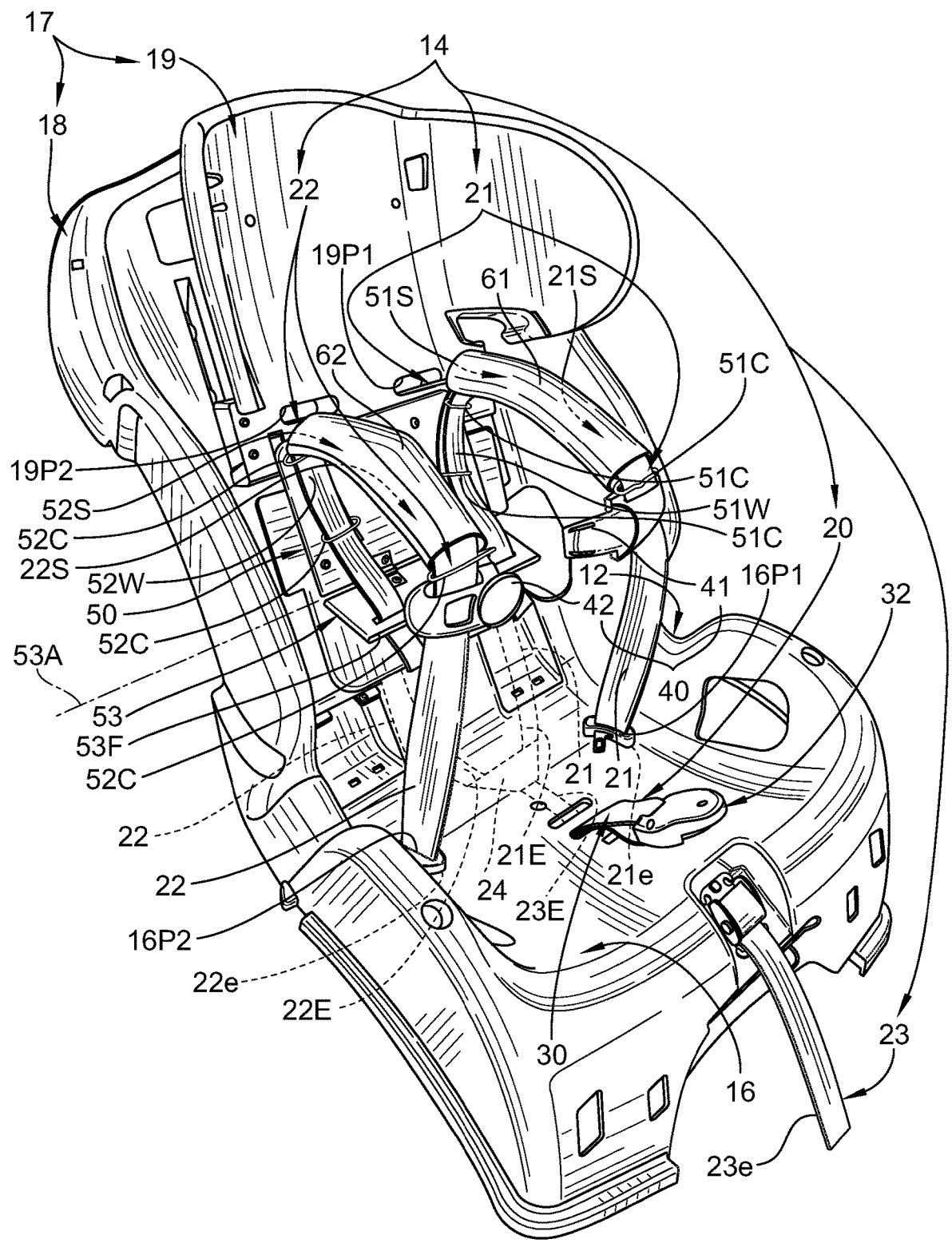
FIG. 1 is a perspective view of a child restraint in accordance with the present disclosure including a juvenile seat comprising a seat bottom and a seat back extending upwardly from the seat bottom and including a stationary backrest and a movable headrest mounted for up-and-down movement on the stationary backrest, a child-restraint harness coupled to the seat bottom and seat back and shown in an OPENED CHILD-SEATING-AND-RELEASING MODE, and a hands-free harness mover coupled to the headrest to move therewith and linked to first and second side belts including in the child-restraint harness and showing that the hands-free harness is configured to retain shoulder-gripping portions of the first and second side belts in raised positions above the seat bottom to allow a caregiver to place a child in the seat easily under the raised side belts without first having to spread and hold the side belts above the seat bottom and showing that a movable actuator flap included in the hands-free harness mover is urged to assume a normal forwardly extended position so as to engage the back of a child as the child is being seated on the seat bottom by a caregiver.

An illustrative child restraint 10 comprises a juvenile seat 12, a child-restraint harness 14, and a hands-free harness mover 15 as shown in FIG. 1. Child-restraint harness 14 is linked to hands-free harness mover 15 and is adapted to be changed automatically by the hands-free harness mover 15 from an OPENED CHILD-SEATING-AND-RELEASING MODE shown in FIG. 1 to a CLOSED CHILD-RESTRAINING MODE when a child is moved by a caregiver to press against the hands-free harness mover 15 as the child is being seated in juvenile seat 12 as suggested in FIG. 2. Once the child is removed by a caregiver from juvenile seat 12 any pressure that had been applied by the seated child to hands-free harness mover 15 is removed and the harness mover 15 functions automatically to change child-restraint harness 14 back to the OPENED CHILD-SEATING-AND-RELEASING MODE. This automatic mode change readies juvenile seat 12 to receive a child.

Figure 2:
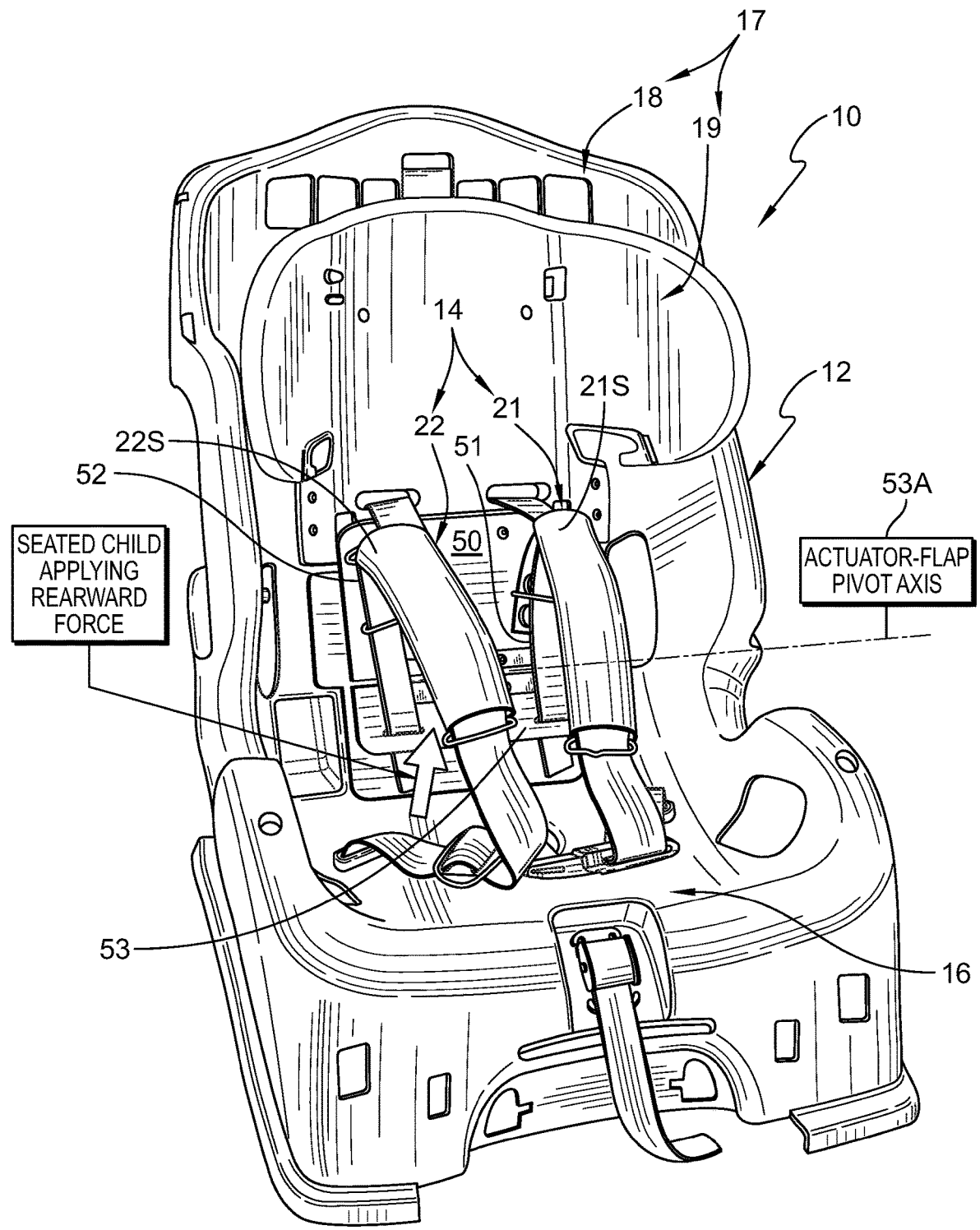
FIG. 2 is a view similar to FIG. 1 showing that the movable actuator flap has been pivoted downwardly about a horizontal actuator-flap pivot axis toward the seat back to assume a temporary rearwardly retracted position by a rearwardly directed external child-seating force (applied in this case by the hand of a child restraint demonstrator whereas in practice the force would be applied by a rearwardly moving (carried by a caregiver) child engaging a leading edge of the pivotable actuator flap when being placed in the juvenile seat) to cause the shoulder-gripping portions of the first and second side belts to move from raised positions shown in FIG. 1 which place the child-restraint harness in the OPENED CHILD-SEATING-AND-RELEASING MODE to the lowered positions shown in FIG. 2 to place the child-restraint harness in a CLOSED CHILD-RESTRAINING MODE.
Figure 5:
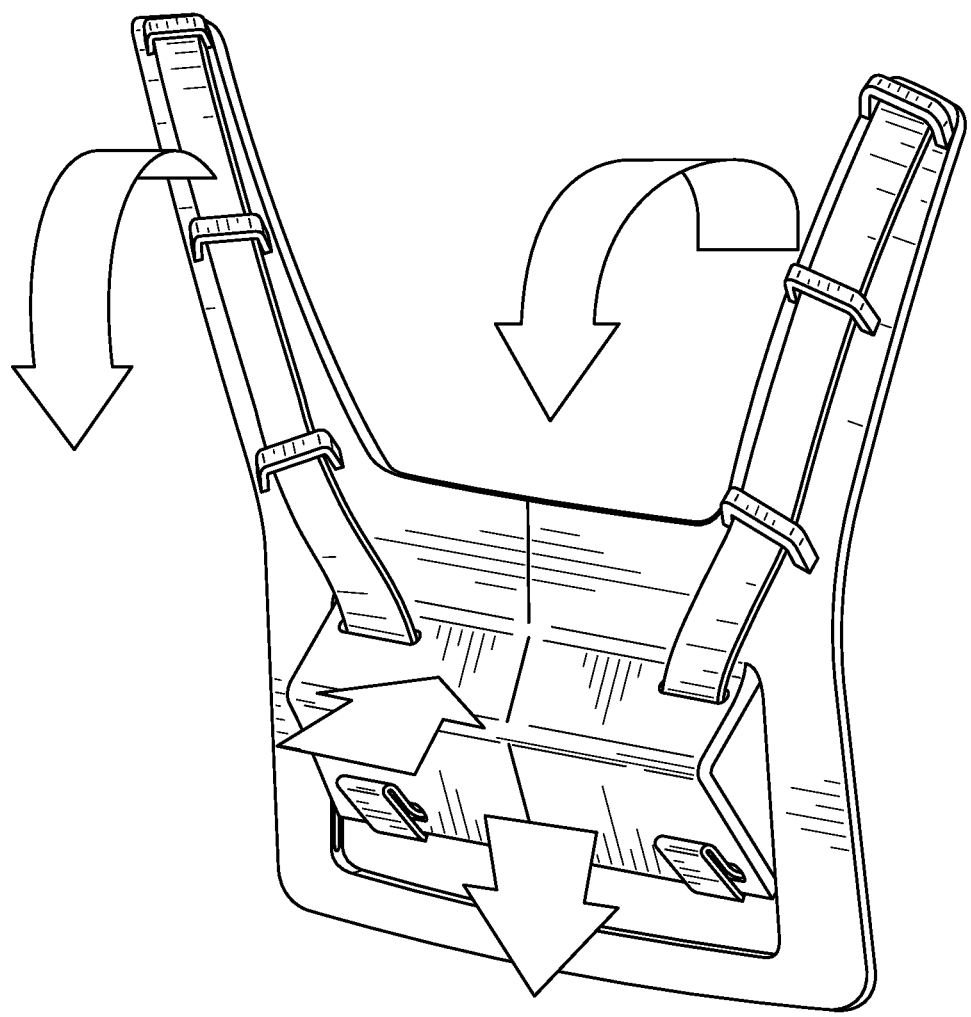
FIG. 5 is a diagrammatic view similar to FIG. 3 showing another embodiment of a hands-free harness mover in accordance with the present disclosure.

Juvenile seat 12 includes a seat bottom 16 and a seat back 17 including a stationary backrest 18 arranged to extend upwardly from seat bottom 16 and a movable headrest 19 mounted for up-and-down movement on backrest 18 as suggested in FIGS. 1 and 2. In illustrative embodiments, hands-free harness mover 15 is mounted on movable headrest 19 for up-and-down movement therewith relative to seat bottom 16 and is linked to shoulder-gripping portions 21S, 22S first and second side belts 21, 22 in child restraint harness 14. When juvenile seat 12 is unoccupied, as shown in FIG. 1, hands-free harness mover 15 functions automatically to change child-restraint harness 14 to the OPENED CHILD-SEATING-AND-RELEASING MODE. In contrast, when juvenile seat 12 is occupied, as suggested in FIG. 2, hands-free harness mover 15 functions automatically to change child-restraint harness 14 to the CLOSED CHILD-RESTRAINING MODE.

Child-restraint harness 14 is illustratively a five-point harness and comprises a crotch belt 20, a first side belt 21, and a second side belt 22 as shown in FIGS. 1 and 2. Child-restraint harness 14 also comprises a harness-tightening belt 23 and a splitter plate 24. Crotch belt 20 is coupled to seat bottom 16. Ends 21E, 22E of first and second side belts 21, 22 are coupled to splitter plate 24. Harness-tightening belt 23 is also coupled to splitter plate 24 and arranged to extend outwardly through a harness-release unit 25 and terminate at end 23e.

First side belt 21 is coupled at a first end 21E to a splitter plate 24 located under seat bottom 16 or behind backrest 18 and is arranged to pass upwardly behind backrest 18 and outwardly through a first side-belt passageway 19P1 formed in movable headrest 19 and then extend forwardly away from headrest 19 and then downwardly to pass through a first side-belt passageway 16P1 formed in seat bottom 16 to terminate at a second end 21e that is coupled, for example, to seat bottom 16. First side belt 21 includes a shoulder-gripping portion 21S that is arranged to wrap over the first shoulder of a child seated in juvenile seat 12.

Second side belt 22 is coupled at a first end 22E to splitter plate 24 as suggested in FIG. 1 and is arranged to pass upwardly behind backrest 18 and outwardly through a second side-belt passageway 19P2 formed in movable headrest 19 and then extend forwardly away from headrest 19 and then downwardly through a second side-belt passageway 16P2 formed in seat bottom 16 to terminate at a second end 22e that is coupled, for example, to seat bottom 16. Second side belt 22 includes a shoulder-gripping portion 22S that is arranged to wrap over the second shoulder of a child seated in juvenile seat 12.

A first end 23E of harness-tightening belt 23 is coupled to splitter plate 24 as suggested in FIG. 1. Harness-tightening belt 23 passes through harness-release unit 25 and terminates at a free end 23e as suggested in FIG. 1. A caregiver can loosen first and second side belts 21, 22 on a child seated in juvenile seat 12 by activating harness-release unit 25 and pulling outwardly on the portions of belts 21, 22 in front of the seated child. A caregiver can tighten first and second side belts 21, 22 around a seated child by activating harness-release unit 25 and pulling on free end 23e of harness-tightening belt 23.

Crotch belt 20 includes a crotch strap 30 coupled to seat bottom 16 and a buckle 32 coupled to a free end of crotch strap 30 as suggested in FIG. 1. Buckle 32 is configured to be coupled to a harness retainer 40 that is also included in child-restraint harness 14. Harness retainer 40 includes a first member 41 coupled to first side belt 21 and configured to mate with buckle 32 when child-restraint harness 14 is in the CLOSED CHILD-RESTRAINING MODE and a second member 42 coupled to second side belt 22 and configured to mate with buckle 32 when child-restraint harness 14 is in the CLOSED CHILD-RESTRAINING MODE.

Hands-free harness mover 15 includes a base 50 mounted on headrest 19, a first side-belt position changer 51 coupled to shoulder-gripping portion 21S of first side belt 21, a second side-belt position changer 52 coupled to shoulder-gripping portion 22S of second side belt 22, and a movable actuator flap 53 as shown, for example, in FIGS. 3 and 3A. Movable actuator flap 53 is mounted to base 50 for pivotable movement about horizontal actuator-flap pivot axis 53A between a normal forwardly extended position shown in FIGS. 1, 3, and 3A and a temporary rearwardly retracted position shown in FIGS. 2, 4, and 4A. The first and second side-belt position changers 51, 52 cooperate to define a belt-motion controller 54 for automatically raising and lowering shoulder-gripping portions 21S, 22S of first and second side belts 21, 22 at the proper time during seating and unseating of a child in juvenile seat 12.

Movable actuator flap 53 is coupled first and second side-belt position changers 51, 52 as suggested in FIGS. 3A and 4A. Movable actuator flap 53 is arranged to actuate first and second side-belt position changers 51, 52 to cause shoulder-gripping portions of 21S, 22S first and second side belts 21, 22 to move between the raised and lowered positions in response to pivotable movement of movable actuator flap 53 about horizontal actuator-flap pivot axis 53A relative to base 50 as suggested in FIGS. 1 and 2.

First side-belt position changer 51 includes a first elastic strip 51S associated with first side belt 21, a first webbing 51W having a lower end coupled to a free end 53F of movable actuator flap 53 and an upper end coupled to an upper tip of first elastic strip 51S, and several first-webbing retainer clips 51C as shown, for example in FIGS. 3, 3A and 4, 4A. An upper shoulder-gripping portion 21S of first side belt 21 is coupled to first elastic strip 51S using, for example, sleeve 61 to move with first elastic strip 51S during pivotable movement of movable actuator flap 53 about the horizontal actuator-flap pivot axis 53A as suggested in FIGS. 1 and 2. First-webbing retainer clips 51C are coupled to first elastic strip 51S to allow for relative movement between first webbing 51W and first elastic strip 51S during pivotable movement of movable actuator flap 53 and the resulting raising and lowering of shoulder-gripping portion 21S of first side belt 21 relative to seat bottom 16.

Second side-belt position changer 52 includes a second elastic strip 52S associated with second side belt 22, a second webbing 52W having a lower end coupled to free end 53F of movable actuator flap 53 and an upper end coupled to an upper tip of second elastic strip 52S, and several second-webbing retainer clips 52C as shown, for example, in FIGS. 3A and 4A. An upper shoulder-gripping portion 22S of second side belt 22 is coupled to second elastic strip 52S using, for example, sleeve 62 to move with second elastic strip 52S during pivotable movement of movable actuator flap 53 about the horizontal actuator-flap pivot axis 53A as suggested in FIGS. 1 and 2. Second-webbing retainer clips 52C are coupled to second elastic strip 52S to allow for relative movement between second webbing 52W and second elastic strip 52S during pivotable movement of movable actuator flap 53 and the resulting raising and lowering of shoulder-gripping portion 22S of second side belt 22 relative to seat bottom 16.

Each of elastic strips 51S, 52S has plastic characteristics and is fixed at one end to base 50 so as to allow these strips to flex when deformed by a force applied by the companion webbings 51, 52W as suggested in FIG. 4A. Each of elastic strips 51S, 52S then returns to its resting position when such a force is no longer applied as suggested in FIG. 3A. Each of the retainer clips 51C, 52C cooperates to provide a series of fixtures that allow the webbings 51W, 52W to be routed through, providing fixed locations on the elastic strips 51S, 52S for the webbings 51W, 52W to be pulled against. Each webbing 51W, 52W is attached to the movable actuator flap 53 which articulates when pressure is applied as suggested in FIGS. 3A and 4A. From the resting position shown in FIG. 3A, when actuator flap 53 is pivoted, webbings 51W, 52W are pulled against webbing retainer clips 51C, 52C to shorten the amount of webbing and curling the two sprung strips 51S, 52S as shown in FIG. 4A.

When a caregiver places a child on seat bottom 16 of juvenile seat 12, the child will engage the leading edge 53F of movable actuator flap 53 and cause movable actuator flap 53 to pivot about horizontal actuator-flap pivot axis 53A from the normal forwardly extended position shown in FIGS. 1, 3, and 3A to the temporary rearwardly retracted position shown in FIGS. 2, 4, and 4A. Such pivoting movement of movable actuator flap 53 applies a downward force to the lower ends of each of the first and second webbings 51W, 52W. Such force is transferred by first webbing 51W to the tip of first elastic strip 51S and by second webbing 52W to the tip of second elastic strip 52S. Such a force transfer causes upper portions of each of first and second elastic strips 51S, 52S to curl in a forward and downward direction as shown, for example, in FIG. 4A so that: (1) the shoulder-gripping portion 21S of first side belt 21 that is linked to first elastic strip 51S moves from the raised position shown in FIG. 1 (and suggested in FIGS. 3 and 3A) to the lowered position shown in FIG. 2 (and suggested in FIGS. 4 and 4A) and (2) the shoulder-gripping portion 22S of second side belt 22 that is linked to second elastic strip 52S moves from the raised position shown in FIG. 1 (and suggested in FIG. 3A) to the lowered position shown in FIG. 2 (and suggested in FIG. 4A).

Hands-free harness mover 15 is configured to use the weight and position of a child occupying juvenile seat 12 to allow child-restraint harness 14 to position itself automatically relative to juvenile seat 12, webbings 51W, 52W, and related features 51S, 51C, 52S, and 52C along with side belts 21, 22 cooperate to allow a non-linear relationship between the travel distance of the movable actuator flap 53 and the distance traveled by the elastic strips 51S, 52S. Hands-free harness mover 15 not only positions side belts 21, 22 of child-restraint harness 14 out of the way to facilitate placement of a child in juvenile seat 12, but also moves side belts 21, 22 automatically to a proper closed position to allow buckling of the seated child without manually positioning side belts 21, 22.

Hands-free harness mover 15 is coupled to first and second side belts 21, 22 and used in accordance with the present disclosure to raise shoulder-gripping portions 21S, 22S of side belts 21, 22 above seat bottom 16 automatically to make it easier for a caregiver to seat a child in juvenile seat 12 and then to lower the shoulder-gripping portions 21S, 22S of side belts 21, 22 toward seat bottom 16 automatically as the child is being seated by the caregiver to wrap over the shoulders of the seated child so as to facilitate mating engagement of the side belts 21, 22 with the crotch belt 20 to restrain the seated child. Hands-free harness mover 15 is configured to hold shoulder-gripping portions 21S, 22S of first and second side belts 21, 22 automatically in a raised position above seat bottom 16 so that a caregiver can place a child easily in juvenile seat 12 under the raised side belts 21, 22 as suggested in FIG. 1 without having to use a hand or some other means to raise the shoulder-gripping portions 21S, 22S side belts 21, 22 upwardly to allow the child to be placed unhindered in juvenile seat 12. Hands-free harness mover 15 is also configured to cause automatic hands-free lowering of the shoulder-gripping portions 21S, 22S of first and second side belts 21, 22 toward seat bottom 16 to a lowered position as the child is placed in juvenile seat 12 so that the shoulder-gripping portions 21S, 22S of first and second side belts 21, 22 are wrapped over the shoulders of the seated child and arranged to be mated with a free end of crotch belt 20 to restrain the child in juvenile seat 12 without requiring the caregiver to handle the side belts 21, 22 manually.

In illustrative embodiments, a movable actuator flap 53 included in hands-free harness mover 15 is arranged to be moved by a child (during seating of the child in juvenile seat 12) from a normal forwardly extended position shown in FIGS. 1, 3, and 3A to a temporary rearwardly retracted position shown in FIGS. 2, 4, and 4A. A belt-motion controller 54 also included in hands-free harness mover 15 is linked to movable actuator flap 53 and to each of the first and second side belts 21, 22. The belt-motion controller 54 is configured to provide means for moving the shoulder-gripping portions 21S, 22S of first and second side belts 21, 22 automatically from the raised positions in which the shoulder-gripping portions 21S, 22S of side belts 21, 22 are projected upwardly away from seat bottom 16 to the lowered positions in which the side belts 21, 22 are wrapped over the shoulders of a seated child to lie closer to seat bottom 16 in response to placement of a child in juvenile seat 12 in such a way as to contact movable actuator flap 53 and cause the movable actuator flap 53 to move from the normal forwardly extended position toward seat back 17 to the temporary rearwardly retracted position. Once the seated child is later removed from juvenile seat 12 the belt-motion controller 54 provides means for returning the shoulder-gripping portions 21S, 22S of first and second side belts 21, 22 automatically from the lowered positions to the raised positions to separate the side belts 21, 22 from the seated child so that removal of the child from juvenile seat 12 by a caregiver is possible without requiring the caregiver first to grasp both side belts 21, 22 and then move the shoulder-gripping portions 21S, 22S of side belts 21, 22 upwardly from the lowered positions to the raised positions prior to or during removal of the seated child from juvenile seat 12.

The invention claimed is:

1. A child restraint comprising
a juvenile seat having a seat bottom and a seat back, the seat back including a backrest arranged to extend upwardly from the seat bottom and a headrest mounted for up-and-down movement on the backrest,
a child-restraint harness including a first side belt adapted to wrap over a first shoulder of a child seated on the seat bottom and a second side belt adapted to wrap over a second shoulder of a child seated on the seat bottom, and
a hands-free harness mover coupled to the headrest to move up and down therewith relative to the backrest and to the seat bottom and linked to the first and second side belts, the hands-free harness mover being configured to provide means for automatically holding shoulder-gripping portions of the first and second side belts in a raised position above the seat bottom so that a caregiver can place a child easily on the seat bottom in the juvenile seat under the shoulder-gripping portions without having to use a hand to raise the shoulder-gripping side portions manually upwardly to allow the child to be placed in the juvenile seat and for automatically lowering the shoulder-gripping portions of the first and second side belts toward the seat bottom to lowered positions in response to movement of a child onto the seat bottom so that the shoulder-gripping portions of the first and second side belts are moved relative to the headrest to wrap over the shoulders of the child now seated on the seat bottom and anchor portions of the first and second side belts are arranged to lie between the shoulder-gripping portions and the seat bottom to be mated with a buckle coupled to a free end of the crotch belt.

2. The child restraint of claim 1, wherein the hands-free harness mover includes a base coupled to the headrest to move up and down therewith relative to the backrest and the seat bottom, a movable actuator flap mounted to the base for movement between a normal forwardly extended position extending away from the headrest and a temporary rearwardly retracted position lying alongside a forward-facing surface of the headrest, and a belt-motion controller configured to provide means for moving the shoulder-gripping portions of the first and second side belts automatically from the raised positions to the lowered positions in response to placement of a child on the seat bottom in the juvenile seat so as to contact the movable actuator flap and cause the movable actuator flap to move from the normal forwardly extended position toward the seat back to the temporary rearwardly retracted position.

3. The child restraint of claim 2, wherein the belt-motion controller is also configured to provide means for returning the shoulder-gripping portions of the first and second side belts automatically from the lowered positions to the raised positions to separate the shoulder-gripping portions of the first and second side belts from a child seated on the seat bottom so that removal of the child from the seat bottom by a caregiver is possible without first requiring the caregiver first to grasp both side belts and move the shoulder-gripping portions of the side belts upwardly from the lowered positions to the raised positions prior to or during removal of the child from the juvenile seat.

4. The child restraint of claim 1, wherein the hands-free harness mover includes a base coupled to the headrest to move up and down therewith relative to the backrest and the seat bottom, a movable actuator flap mounted to the base for movement between a normal forwardly extended position and a temporary rearwardly retracted position, a first side-belt position changer coupled at an upper end thereof to the shoulder-gripping portion of the first side belt and at a lower end thereof to the movable actuator flap and a second side-belt position changer coupled at an upper end thereof to the shoulder-gripping portion of the second side belt and at a lower end thereof to the movable actuator flap.

5. The child restraint of claim 4, wherein the first side-belt position changer is configured to yieldably retain the movable actuator flap in the normal forwardly extended position until a rearwardly directed external child-seating force is applied to the movable actuator flap to cause the movable actuator flap to move to assume the temporary rearwardly retracted position and thereby cause the shoulder-gripping portions of the first and second side belts to move from the raised positions to the lowered positions.

6. The child restraint of claim 4, wherein the movable actuator flap is mounted on a lower edge of the base for pivotable movement relative to the base about a horizontal actuator-flap pivot axis.

7. The child restraint of claim 6, wherein the first side-belt position changer includes a first elastic strip associated with and linked to the shoulder-gripping portion of the first side belt, a first webbing having a lower end coupled to a free end of the movable actuator flap and an upper end coupled to an upper tip of the first elastic strip, and several first-webbing retainer clips to couple the first webbing to the first elastic strip to allow for relative movement between the first webbing and the first elastic strip during raising and lowering of the shoulder-gripping portion of the first side belt.

8. The child restraint of claim 7, wherein the movable actuator flap is mounted on the base to pivot downwardly toward the seat bottom from the normal forwardly extended position to the temporary rearwardly retracted position in response to application of a downward force to the lower end of the first webbing which was transferred by the first webbing to the tip of the first elastic strip so as to cause an upper portion of the first elastic strip that is coupled to the shoulder-gripping portion of the first side belt to curl in a forward and downward direction so that the shoulder-gripping portion of the first side belt is moved from the raised position to the lowered position.

9. The child restraint of claim 4, wherein the first side-belt position changer includes a first elastic strip associated with and linked to the shoulder-gripping portion of the first side belt, a first webbing having a lower end coupled to a free end of the movable actuator flap and an upper end coupled to an upper tip of the first elastic strip to cause the movable actuator flap normally to move to the raised position, and at least one first webbing retainer clip coupled to the first elastic strip and the first webbing to allow for relative movement of the movable actuator flap and resulting raising and lowering of the shoulder-gripping portion of the first side belt.

10. The child restraint of claim 9, wherein the movable actuator flap is mounted on a lower edge of the base for pivotable movement relative to the base about a horizontal actuator-flap pivot axis.

11. A child restraint comprising
a juvenile seat having a seat bottom and a seat back arranged to extend upwardly from the seat bottom,
a child-restraint harness including a first side belt adapted to wrap over a first shoulder of a child seated on the seat bottom and a second side belt adapted to wrap over a second shoulder of a child seated on the seat bottom, and
a hands-free harness mover linked to the first and second side belts, the hands-free harness mover being configured to provide means for automatically holding shoulder-gripping portions of the first and second side belts in a raised position above the seat bottom so that a caregiver can place a child easily on the seat bottom in the juvenile seat under the shoulder-gripping portions without having to use a hand to raise the shoulder-gripping side portions manually upwardly to allow the child to be placed in the juvenile seat.

12. The child restraint of claim 11, wherein the hands-free harness is configured to provide means for automatically lowering the shoulder-gripping portions of the first and second side belts toward the seat bottom to lowered positions in response to movement of a child onto the seat bottom so that the shoulder-gripping portions of the first and second side belts are moved relative to the headrest to wrap over the shoulders of the child now seated on the seat bottom and anchor portions of the first and second side belts are arranged to lie between the shoulder-gripping portions and the seat bottom to be mated with a buckle coupled to a free end of the crotch belt.

13. The child restraint of claim 11, wherein the seat back includes a backrest arranged to extend upwardly from the seat bottom and a headrest mounted for up-and-down movement on the backrest, and the hands-free harness mover includes a base coupled to the headrest to move up and down therewith relative to the backrest and the seat bottom, a movable actuator flap mounted to the base for movement between a normal forwardly extended position extending away from the headrest and a temporary rearwardly retracted position lying alongside a forward-facing surface of the headrest, and a belt-motion controller configured to provide means for moving the shoulder-gripping portions of the first and second side belts automatically from the raised positions to lowered positions in response to placement of a child on the seat bottom in the juvenile seat so as to contact the movable actuator flap and cause the movable actuator flap to move from the normal forwardly extended position toward the seat back to the temporary rearwardly retracted position.

14. The child restraint of claim 13, wherein the belt-motion controller is also configured to provide means for returning the shoulder-gripping portions of the first and second side belts automatically from the lowered positions to the raised positions to separate the shoulder-gripping portions of the first and second side belts from a child seated on the seat bottom so that removal of the child from the seat bottom by a caregiver is possible without first requiring the caregiver first to grasp both side belts and move the shoulder-gripping portions of the side belts upwardly from the lowered positions to the raised positions prior to or during removal of the child from the juvenile seat.

15. A child restraint comprising
a juvenile seat having a seat bottom and a seat back arranged to extend upwardly from the seat bottom,
a child-restraint harness including a first side belt adapted to wrap over a first shoulder of a child seated on the seat bottom and a second side belt adapted to wrap over a second shoulder of a child seated on the seat bottom, and
a hands-free harness mover linked to the first and second side belts, the hands-free harness mover being configured to provide means automatically lowering shoulder-gripping portions of the first and second side belts toward the seat bottom to lowered positions in response to movement of a child onto the seat bottom so that the shoulder-gripping portions of the first and second side belts are moved relative to the seat back to wrap over the shoulders of the child now seated on the seat bottom and anchor portions of the first and second side belts are arranged to lie between the shoulder-gripping portions and the seat bottom to be mated with a buckle coupled to a free end of the crotch belt.

16. The child restraint of claim 15, wherein the hands-free harness is configured to provide means for automatically holding shoulder-gripping portions of the first and second side belts in a raised position above the seat bottom so that a caregiver can place a child easily on the seat bottom in the juvenile seat under the shoulder-gripping portions without having to use a hand to raise the shoulder-gripping side portions manually upwardly to allow the child to be placed in the juvenile seat.

17. The child restraint of claim 15, wherein the seat back includes a backrest arranged to extend upwardly from the seat bottom and a headrest mounted for up-and-down movement on the backrest, and wherein the hands-free harness mover includes a base coupled to the headrest to move up and down therewith relative to the backrest and the seat bottom, a movable actuator flap mounted to the base for movement between a normal forwardly extended position extending away from the headrest and a temporary rearwardly retracted position lying alongside a forward-facing surface of the headrest, and a belt-motion controller configured to provide means for moving the shoulder-gripping portions of the first and second side belts automatically from raised positions to the lowered positions in response to placement of a child on the seat bottom in the juvenile seat so as to contact the movable actuator flap and cause the movable actuator flap to move from the normal forwardly extended position toward the seat back to the temporary rearwardly retracted position.

18. The child restraint of claim 17, wherein the belt-motion controller is also configured to provide means for returning the shoulder-gripping portions of the first and second side belts automatically from the lowered positions to the raised positions to separate the shoulder-gripping portions of the first and second side belts from a child seated on the seat bottom so that removal of the child from the seat bottom by a caregiver is possible without first requiring the caregiver first to grasp both side belts and move the shoulder-gripping portions of the side belts upwardly from the lowered positions to the raised positions prior to or during removal of the child from the juvenile seat.

19. A child restraint comprising
a juvenile seat having a seat bottom and a seat back, the seat back including a backrest arranged to extend upwardly from the seat bottom and a headrest mounted for up-and-down movement on the backrest,
a child-restraint harness including a first side belt adapted to wrap over a first shoulder of a child seated on the seat bottom and a second side belt adapted to wrap over a second shoulder of a child seated on the seat bottom, and
a hands-free harness mover coupled to the headrest to move up and down therewith relative to the backrest and to the seat bottom and linked to the first and second side belts, the hands-free harness mover including a base coupled to the headrest to move up and down therewith relative to the backrest and the seat bottom, a movable actuator flap mounted to the base for movement between a normal forwardly extended position extending away from the headrest and a temporary rearwardly retracted position lying alongside a forward-facing surface of the headrest, and a belt-motion controller configured to provide means for moving shoulder-gripping portions of the first and second side belts automatically from raised positions to lowered positions in response to placement of a child on the seat bottom in the juvenile seat so as to contact the movable actuator flap and cause the movable actuator flap to move from the normal forwardly extended position toward the seat back to the temporary rearwardly retracted position.

20. A child restraint comprising
a juvenile seat having a seat bottom and a seat back, the seat back including a backrest arranged to extend upwardly from the seat bottom and a headrest mounted for up-and-down movement on the backrest,
a child-restraint harness including a first side belt adapted to wrap over a first shoulder of a child seated on the seat bottom and a second side belt adapted to wrap over a second shoulder of a child seated on the seat bottom, and
a hands-free harness mover coupled to the headrest to move up and down therewith relative to the backrest and to the seat bottom and linked to the first and second side belts, the hands-free harness mover including a base coupled to the headrest to move up and down therewith relative to the backrest and the seat bottom, a movable actuator flap mounted to the base for movement between a normal forwardly extended position and a temporary rearwardly retracted position, a first side-belt position changer coupled at an upper end thereof to a shoulder-gripping portion of the first side belt and at a lower end thereof to the movable actuator flap and a second side-belt position changer coupled at an upper end thereof to a shoulder-gripping portion of the second side belt and at a lower end thereof to the movable actuator flap.

* * * * *